United States Patent [19]

Goeke et al.

[11] 4,005,624
[45] Feb. 1, 1977

[54] METAL PEELING MACHINE WITH MOVABLE CLAMPING CARRIAGE

[75] Inventors: Alfons Goeke; Franz Riedel, both of Solingen, Germany

[73] Assignee: Th. Kieserling & Albrecht, Solingen, Germany

[22] Filed: May 13, 1975

[21] Appl. No.: 576,979

[30] Foreign Application Priority Data

May 14, 1974 Germany .......................... 2423210

[52] U.S. Cl. ................................ 82/20; 29/200 D; 29/568; 29/56.5

[51] Int. Cl.² .................... B23B 5/00; B23P 19/00; B23Q 7/00

[58] Field of Search ................ 82/20;4;35; 29/568, 401, 200 R, 29/200 D

[56] References Cited

UNITED STATES PATENTS

| | | |
|---|---|---|
| 3,246,391 | 4/1966 | Coleman .......................... 29/200 D |
| 3,256,600 | 6/1966 | Swanson et al. ...................... 29/568 |
| 3,486,403 | 12/1969 | Schweer et al. ....................... 82/20 |
| 3,550,487 | 12/1970 | Randall et al. ....................... 29/568 |
| 3,590,463 | 7/1971 | Burroughs et al. .................. 29/401 |
| 3,747,822 | 7/1973 | Lorenz et al. ......................... 82/20 |
| 3,750,497 | 8/1973 | Goeke et al. .......................... 82/20 |

*Primary Examiner*—Harrison L. Hinson
*Attorney, Agent, or Firm*—Edward E. Sachs

[57] ABSTRACT

A metal peeling machine for workpieces such as rods and tubes having a clamping carriage movably mounted on the machine bed. The carriage also receives a clamping arrangement which not only engages the workpiece but also is adapted to engage a workpiece guide sleeve, if and when the guide sleeve has to be moved for service purposes. The guide sleeve is provided with. clamping means which are constructed to co-act with the aforementioned clamping arrangement on the carriage.

7 Claims, 5 Drawing Figures

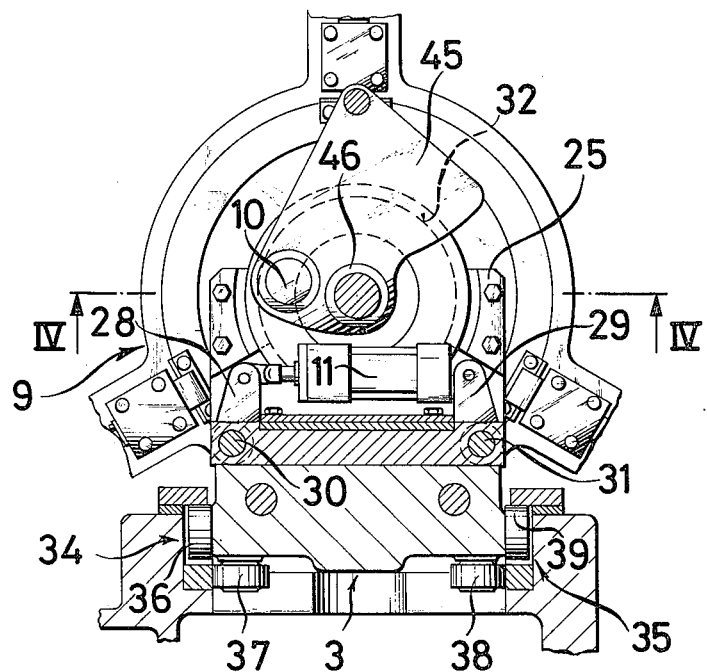
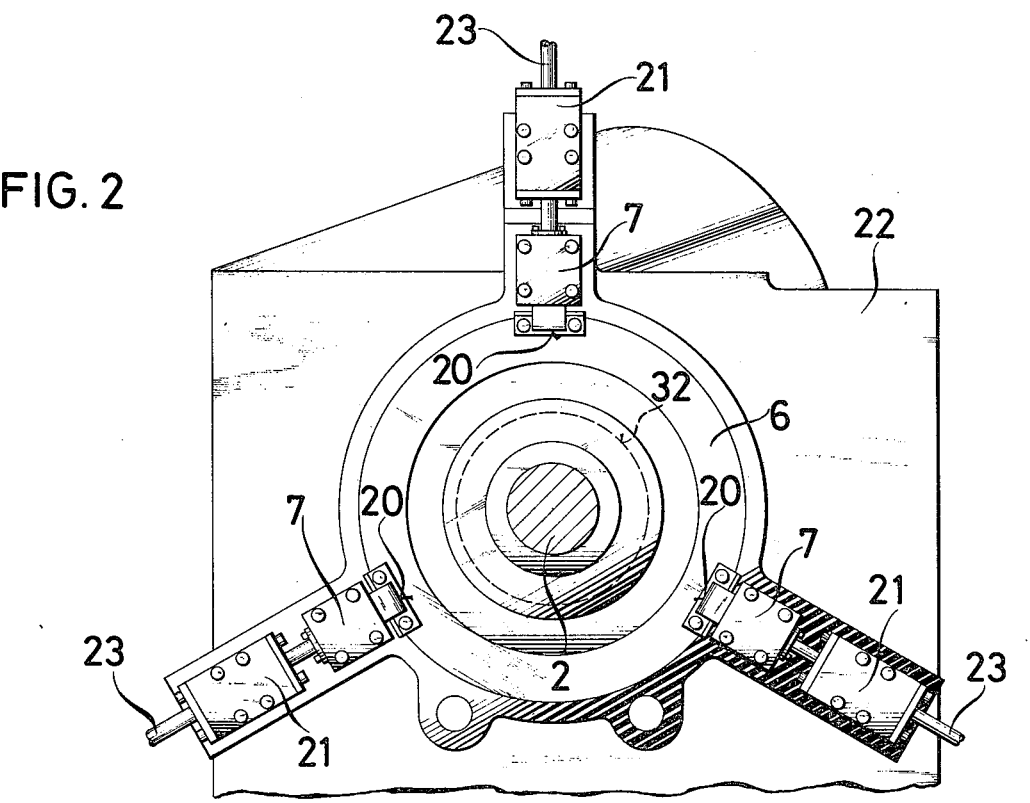

METAL PEELING MACHINE WITH MOVABLE CLAMPING CARRIAGE

The present invention relates generally to a metal peeling machine for rods and tubes and, more particularly, to a machine provided with a movable clamping carriage and having an improved workpiece guiding arrangement.

In the prior art, metal peeling machines are common in which, during operation, small pieces of scrap, chips or dirt generally become lodged in places in which they hinder the movement or function of movable machine parts. This problem results at least in part from the requirement that the metal workpiece be moved close to the machining location to avoid undesirable rocking or vibration. Particularly affected are feed guides which become blocked, from time to time, and have to be disassembled and cleaned. Also, the rolls which guide the workpieces have to be replaced occasionally. These guides are usually secured in a sleeve which protrudes into the machine with guide rolls. A small quantity of a cooling medium and chips flow through the sleeve to the outside. More specifically, the sleeve, which is secured to the machine bed, projects into the opening of the cutter head up to the cutting knife or blade in order to support the workpiece in that location. A metal peeling machine of this category is described in German Pat. No. 2,059,565. In order to remove the guide sleeve, it has heretofore been customary to use a crane and other auxiliary devices to facilitate a careful pulling of the sleeve out of the machine. Even just slight inattention or a careless removal of the sleeve frequently results in damage to the sleeve and the machine itself.

It is therefore the primary object of the present invention to provide a metal peeling machine of the general type described above, in which the time and requirements for servicing the sleeve is significantly improved and damage to the sleeve and machine during service can be more readily — or completely avoided.

An aspect of the present invention resides in providing a peeling machine having a clamping carriage on which is provided a clamping arrangement for mounting and dismounting a machine part, such as a guide sleeve, that has to be serviced. The conventional guide and drive means of the carriage can then withdraw the sleeve — by means of the clamping arrangement on the carriage — in a precise and concentric manner relative to the workpiece center line. The dismounting time is thereby appreciably reduced.

As a preferred embodiment of the present invention, there is provided that the clamping arrangement — which secures the part to be serviced to the machine — comprises latches movable radially to the workpiece axis and having a clamping taper which corresponds to or is comlementary with a tapered clamping surface provided on the machine part to be serviced. This achieves that the dismounting of the part can be carried out without tools. Moreover, the time for mounting and dismounting is reduced to a few seconds. By forming the clamping arrangement as latches having clamping surfaces, an interaction with hydraulic control is facilitated which is particularly useful since the carriage also requires hydraulic actuation, so that a hydraulic control system can be justified.

A further embodiment of the present invention provides that the mounting and dismounting clamping arrangement comprises clamping claws which are formed as segments of a profiled annulus or ring. This serves to reduce the clamping forces required for the sleeve.

As a still further embodiment of the present invention, there is provided that the segments are wedge-shaped when viewed in section. The machine part which is to be serviced includes a ring nut shaped to complement the configuration of the wedges. The ring nut has a cross-section which becomes smaller in an inwardly direction. This permits a tight fit of the claws against the machine part and a readjustment thereof.

Another embodiment of the present invention provides a clamping carriage with two movable clamping jaws in which the mounting and dismounting clamping arrangement is formed by the device for clamping the workpiece. Herein, the claws are formed with special projections whose configuration accommodates the profile of the sleeve section which is to be secured. This simplifies the construction of the mounting and dismounting device. During operation and clamping of the workpiece, the carriage does not move so close to the machine housing that the sleeve with guides is also clamped at that time. Only by displacing a limit switch which is associated with the carriage, or of an abutment, are the projections on the workpiece clamping claws moved over the sleeve — so that upon actuation of the claws the sleeve is clamped. In all other respects, the mounting and dismounting of the sleeve vis-a-vis the additional clamping device on the carriage remains the same.

For a better understanding of the present invention, together with other and further objects thereof, reference is had to the following description taken in connection with the accompanying drawings, and its scope will be pointed out in the appended claims.

In the drawings:

FIG. 2 is a sectional view taken along lines II—II of FIG. 1;

FIG. 3 is a sectional view taken along lines III—III of FIG. 1, wherein the carriage is moved close to the machine part to be serviced;

Figure 1:
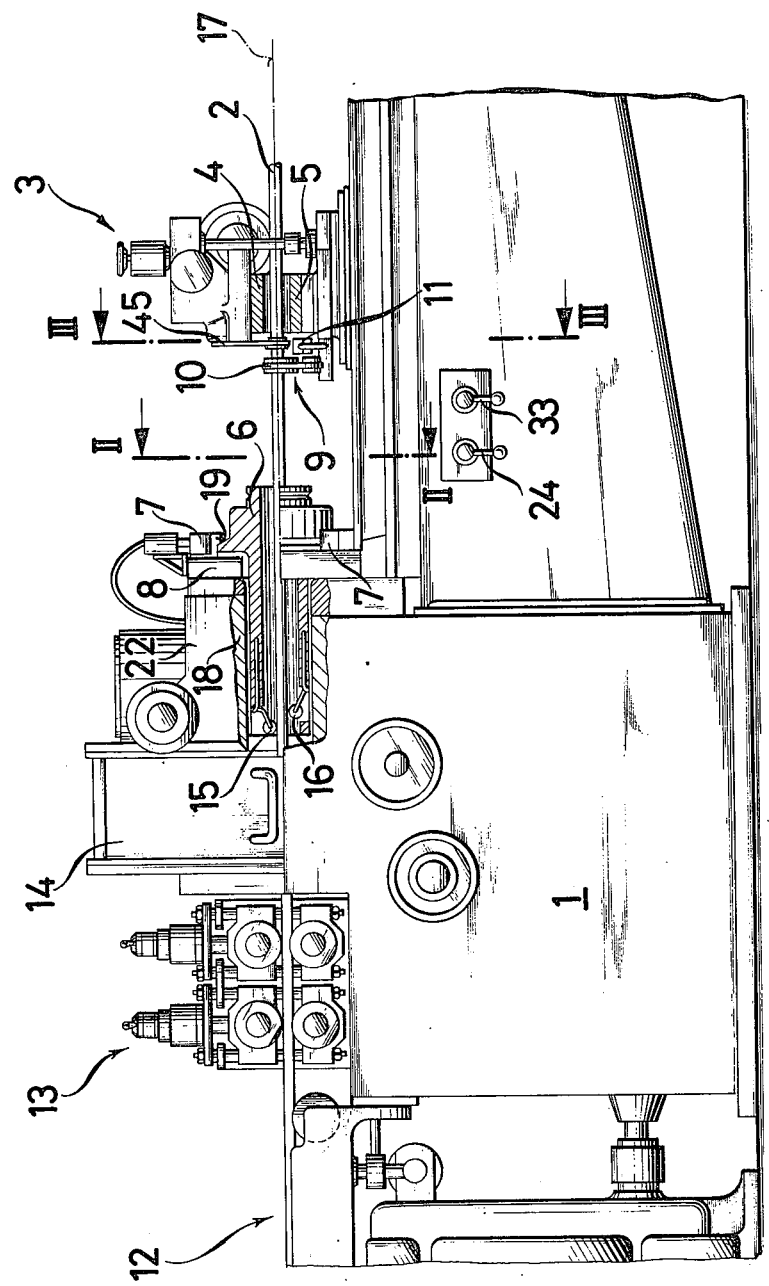
FIG. 1 is, generally, a schematic side view of a metal peeling machine with a clamping device in accordance with this invention.

Referring now to the drawings, there is shown a metal peeling machine 1, for working elongated metal workpieces 2, such as rods or tubes, and comprising a back and forth movable clamping carriage 3 provided with clamping claws 4 and 5 for gripping the workpiece 2 and a mounting and dismounting clamping arrangement 9 which includes clamping claws 10 and a hydraulic cylinder 11. The machine 1 further includes a sleeve 6 which is secured to machine body 8 by means of latches 7. The sleeve 6 is relatively heavy and requires frequent service attention.

The workpiece 2 is channelled along feed trough 12 through feeding apparatus 13 to the cutter head located under the cover 14. The workpiece 2 is supported closely adjacent to the cutter by means of guide rollers 15, 16 to avoid oscillations or other undesirable movement of the workpiece.

While the cutter head (within the cover 14) rotates around the workpiece 2, the workpiece 2 is not rotatably driven. Similarly, the sleeve 6 also does not rotate. The adjustable guide rollers 15, 16 are each, in triplicate, in one plane, vertical to the workpiece center line, distributed equally around the workpiece. These adjustable guide rollers are impeded in their mobility by the chips adhering to the workpieces during the operation of the peeling machine and have to be replaced occasionally. The sleeve 6 is frequently partially closed by chips, scale and rust. For replacing the rollers 15, 16, the sleeve 6, which extensively projects into the region of the cutter head rotating with member 18, must be dismounted and in relation to the illustration shown in FIG. 1, moved to the right. The sleeve is clamped tight in operating condition — by means of latches 7 or bolts with clamping surfaces 19 — onto the outside of the peeling machine. Associated with the clamping surfaces 19 are side tapered clamping surfaces 20 arranged on the sleeve. The sleeve 6 is clamped by means of three latches 7, which are actuated by a hydraulic system including hydraulic cylinders 21, to the machine housing 22. The hydraulic cylinder is energized through supply and discharge conduits 23 and the control of the cylinder is obtained through lever 24 which is suitably interposed in the system (not shown in detail).

The clamping arrangement 9 is secured on the clamping carriage 3 on the side facing the clamping sleeve 6, i.e., between the sleeve and workpiece clamping claws 4, 5. Member 9 comprises two clamping claws 10 and 25 and forms with its wedge-shaped clamping segments 26, 27 a profiled annulus or ring.

Figure 4:
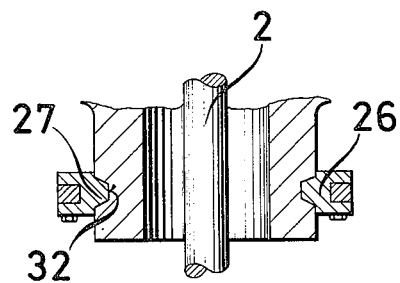
FIG. 4 is a sectional view taken along lines IV—IV of FIG. 3.

The hydraulic cylinder 11 associated with the mounting and dismounting clamping arrangement 9 grips two levers 28, 29 each of which are arranged with one clamping claw 10 and 25 on a shaft 30, 31. This connection synchronizes the movement of lever 28 and the clamping claw 10, as well as the lever 29 with clamping claws 25. When the piston rod (not shown) actuates the cylinder 11, the levers 28, 29 and clamping claws 10 and 25 are moved inwardly. As shown in FIGS. 3 and 4, the clamping claws 10 and 25 grip with their wedge-shaped portion 26, 27 into a ring nut 32 disposed outside of sleeve 6. The ring nut 32 has an inwardly tapering cross-section and is formed like a groove.

For dismounting the sleeve 6, the workpiece 2 is initially removed from the machine. Next, the clamping carriage is moved so close to the sleeve 6 until the clamping claws 10 and 25, at the elevation of the ring nut 32 of the sleeve 6, are moved forward. The actuating lever 33 associated with cylinder 11 is then operated to cause the sleeve 6 to be clamped between clamping claws 10 and 25. After the sleeve 6 is tightly enclosed by claws 10 and 25 of clamping arrangement 9, actuation of levers 24 causes the latches to be withdrawn from the hydraulic cylinders to free the sleeve 6 for removal out of the machine housing. Under these conditions the clamping carriage 3, together with rolls 36, 37, 38, 39 (see FIG. 3), can be drawn to the right; for this purpose the guide patch 34, 35 can be utilized. Conventional drive means (not shown) can be used to move the carriage.

The sleeve 6 is pulled out of the machine housing 22 concentrically to the work axis without tilting or twisting the sleeve. When the sleeve 6 has been moved sufficiently, without, however, having been completely detached from the machine (in FIG. 1 to the right) the sleeve 6 is cleaned and the rollers 15, 16 replaced, if necessary. The installation or mounting of the sleeve 6 occurs in reverse order. Since the clamping is not changed, the sleeve is still in proper alignment position. The pivotably arranged plate 45 shown in FIGS. 1 and 3, comprises guide openings 46 for workpieces of different thicknesses.

Figure 5:
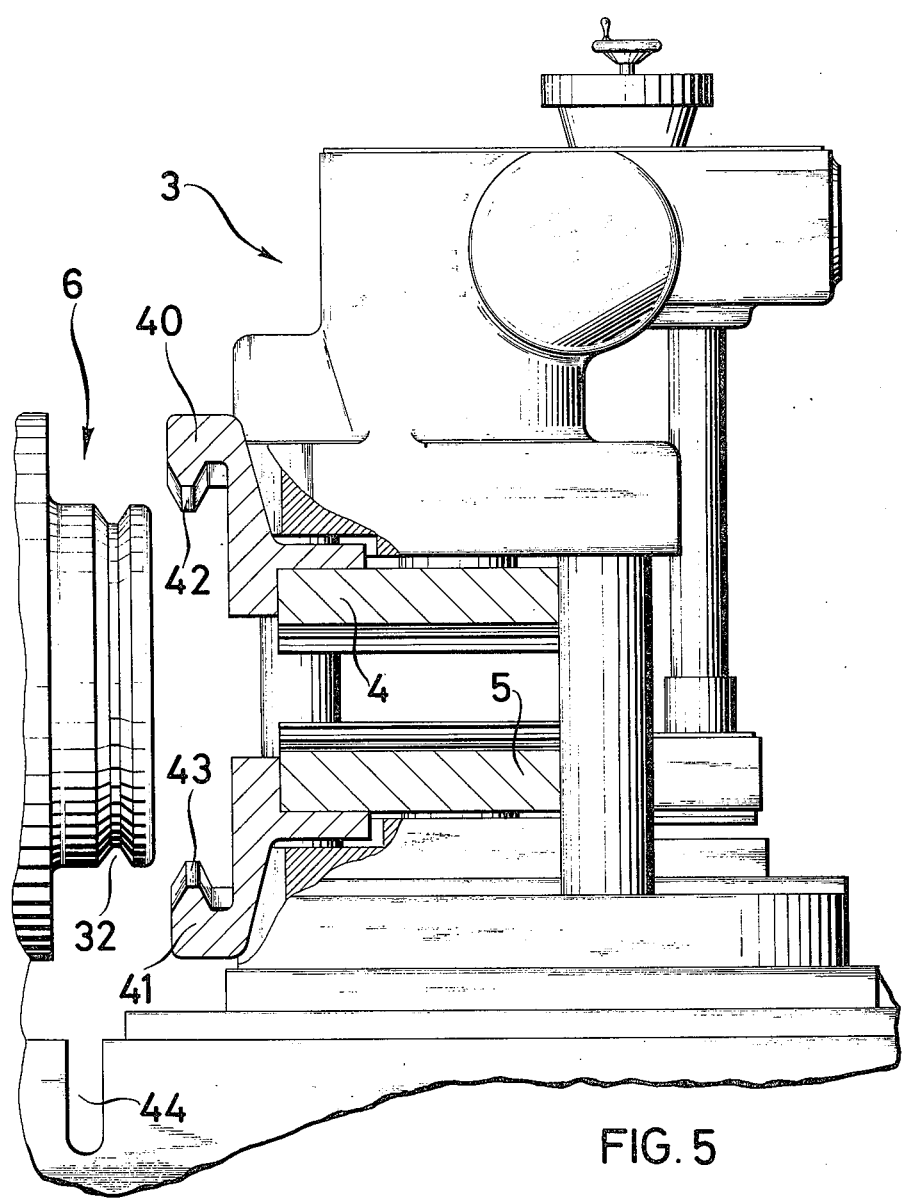
FIG. 5 is a partial, enlarged, view of FIG. 1 illustrating the clamping carriage and claws in greater detail.

Referring now to FIG. 5, there is shown a section of the peeling machine which illustrates the clamping carriage 3 and sleeve 6. The clamping carriage 3 is provided with clamping claws 4, 5 having special projections or abutments 40, 41 formed thereon or secured thereto. The projections 40, 41 are arranged on the side of the clamping claws 4, 5 facing the sleeve 6. FIG. 5 illustrates the nearest position of the clamping carriage to the sleeve 6 for operating position. The clamping abuts a stopper (not shown) provided in cutout 44 formed in the machine bed. The projections 40, 41, which are screwed onto the workpiece clamping claws 4, 5 have wedge-shaped clamping sections 42, 43 which are complementary to the shape of ring nut 32. For clamping the sleeve 6 to the ring nut 32 an abutment was removed from cutout 44 permitting the carriage to move further to the sleeve, until the clamping sections 42, 43 face exactly the ring nut 32. Clamping of sleeve 6 is caused by actuating the workpiece clamping claws 4, 5, which remain unchanged, whereby the clamping sections 42, 43 lock into the ring nut 32 of sleeve 6.

While there have been described what are at present considered to be the preferred embodiments of this invention, it will be obvious to those skilled in the art that various changes and modifications may be made therein without departing from the invention, and it is aimed, therefrom, in the appended claims to cover all such changes and modifications as fall within the true spirit and scope of the invention.

We claim:
1. In a metal peeling machine for workpieces such as rods and tubes comprising:
   a machine bed and a machine housing therefor;
   a workpiece clamping carriage movably mounted relative to said bed;
   a workpiece cutting means mounted on said bed;
   workpiece guide sleeve means arranged for stationary position adjacent to said cutting means and movement relative to said bed, and arranged adjacent to said clamping carriage and projecting into said machine housing;
   disengageable mounting means securing said sleeve in fixed relation to said bed;
   and clamping arrangement mounting and dismounting means secured to said clamping carriage and axially movable therewith for clamping engagement with said sleeve to move said sleeve means in relation to said bed after disengagement of said mounting means.

2. In a peeling machine according to claim 1, wherein said clamping arrangement includes one or more latches provided with a clamping taper, said latches being radially movable relative to the axis of the workpiece; and said sleeve being formed with correspondingly tapere clamping surfaces.

3. In a peeling machine according to claim 1, wherein said clamping arrangement comprises two clamping claws.

4. In a peeling machine according to claim 3, wherein said clamping claws include segments forming a profiled annulus.

5. In a peeling machine according to claim 4, wherein said segments are wedge-shaped.

6. In a peeling machine according to claim 4, and a ring nut on said sleeve complementary in shape to said segments and having an inwardly tapering cross-section.

7. In a peeling machine according to claim 1, wherein said clamping arrangement also functions as the means for clamping the workpiece and comprises two clamping claws with sections thereof having a configuration complementary to that section of said sleeve which is to be clamped to the machine.

* * * * *